(12) United States Patent
Birsan et al.

(10) Patent No.: US 11,003,606 B2
(45) Date of Patent: May 11, 2021

(54) DMA-SCATTER AND GATHER OPERATIONS FOR NON-CONTIGUOUS MEMORY

(71) Applicant: Microchip Technology Incorporated, Chandler, AZ (US)

(72) Inventors: Laurentiu Birsan, Loire Atlantique (FR); Manish Patel, Chandler, AZ (US); Joseph Triece, Phoenix, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/906,262

(22) Filed: Jun. 19, 2020

(65) Prior Publication Data

US 2020/0401540 A1 Dec. 24, 2020

Related U.S. Application Data

(60) Provisional application No. 62/864,719, filed on Jun. 21, 2019.

(51) Int. Cl.
*G06F 13/28* (2006.01)
(52) U.S. Cl.
CPC .................................. *G06F 13/28* (2013.01)
(58) Field of Classification Search
None
See application file for complete search history.

(56) References Cited

U.S. PATENT DOCUMENTS 10,169,271 B1 1/2019 Ahmad et al.
2007/0162643 A1 7/2007 Tousek ........................... 710/22

FOREIGN PATENT DOCUMENTS

WO 99/34273 A2 7/1999

OTHER PUBLICATIONS

International Search Report and Written Opinion, Application No. PCT/US2020/038876, 10 pages, dated Sep. 7, 2020.

*Primary Examiner* — Farley Abad
*Assistant Examiner* — Dayton Lewis-Taylor
(74) *Attorney, Agent, or Firm* — Slayden Grubert Beard PLLC

(57) ABSTRACT

A direct memory access (DMA) controller, includes circuitry configured to load a DMA transfer descriptor configured to define which memory elements within a contiguous block of n memory elements are to be included in a given DMA transfer. The circuitry is further configured to, based on the DMA transfer descriptor, determine whether each memory element within the contiguous block of n memory elements is to be included in the given DMA transfer, including a determination that two or more non-contiguous sub-blocks of memory elements within the contiguous block of n memory elements are to be transferred. The circuitry is further configured to, based on the determination of whether each memory element within the contiguous block of n memory elements is to be included in the given DMA transfer, perform the DMA transfer of memory elements determined to be included within the given DMA transfer.

20 Claims, 7 Drawing Sheets

202

| REGISTER # | ADDRESS |
|---|---|
| REG31 | 0x7C |
| REG30 | 0x78 |
| REG29 | 0x74 |
| REG28 | 0x70 |
| REG27 | 0x6C |
| REG26 | 0x68 |
| REG25 | 0x64 |
| REG24 | 0x60 |
| REG23 | 0x5C |
| REG22 | 0x58 |
| REG21 | 0x54 |
| REG20 | 0x50 |
| REG19 | 0x4C |
| REG18 | 0x48 |
| REG17 | 0x44 |
| REG16 | 0x40 |
| REG15 | 0x3C |
| REG14 | 0x38 |
| REG13 | 0x34 |
| REG12 | 0x30 |
| REG11 | 0x2C |
| REG10 | 0x28 |
| REG9 | 0x24 |
| REG8 | 0x20 |
| REG7 | 0x1C |
| REG6 | 0x18 |
| REG5 | 0x14 |
| REG4 | 0x10 |
| REG3 | 0x0C |
| REG2 | 0x08 |
| REG1 | 0x04 |
| REG0 | 0x00 |

204

| REGISTER # | ADDRESS |
|---|---|
| REG63 | 0x307C |
| REG62 | 0x3078 |
| REG61 | 0x3074 |
| REG60 | 0x3070 |
| REG59 | 0x306C |
| REG58 | 0x3068 |
| REG57 | 0x3064 |
| REG56 | 0x3060 |
| REG55 | 0x305C |
| REG54 | 0x3058 |
| REG53 | 0x3054 |
| REG52 | 0x3050 |
| REG51 | 0x304C |
| REG50 | 0x3048 |
| REG49 | 0x3044 |
| REG48 | 0x3040 |
| REG47 | 0x303C |
| REG46 | 0x3038 |
| REG45 | 0x3034 |
| REG44 | 0x3030 |
| REG43 | 0x302C |
| REG42 | 0x3028 |
| REG41 | 0x3024 |
| REG40 | 0x3020 |
| REG39 | 0x301C |
| REG38 | 0x3018 |
| REG37 | 0x3014 |
| REG36 | 0x3010 |
| REG35 | 0x300C |
| REG34 | 0x3008 |
| REG33 | 0x3004 |
| REG32 | 0x3000 |

206

| REGISTER # | ADDRESS |
|---|---|
| REG163 | 0x20FC |
| ⋮ | ⋮ |
| REG132 | 0x2080 |
| REG131 | 0x207C |
| REG130 | 0x2078 |
| REG129 | 0x2074 |
| REG128 | 0x2070 |
| REG127 | 0x206C |
| REG126 | 0x2068 |
| REG125 | 0x2064 |
| REG124 | 0x2060 |
| REG123 | 0x205C |
| REG122 | 0x2058 |
| REG121 | 0x2054 |
| REG120 | 0x2050 |
| REG119 | 0x204C |
| REG118 | 0x2048 |
| REG117 | 0x2044 |
| REG116 | 0x2040 |
| REG115 | 0x203C |
| REG114 | 0x2038 |
| REG113 | 0x2034 |
| REG112 | 0x2030 |
| REG111 | 0x202C |
| REG110 | 0x2028 |
| REG109 | 0x2024 |
| REG108 | 0x2020 |
| REG107 | 0x201C |
| REG106 | 0x2018 |
| REG105 | 0x2014 |
| REG104 | 0x2010 |
| REG103 | 0x200C |
| REG102 | 0x2008 |
| REG101 | 0x2004 |
| REG100 | 0x2000 |

FIG. 2

| 602 | 312A | 604 | | |
|---|---|---|---|---|
| | | REGISTER | ADDRESS | CONTENTS AFTER WRITE |
| | 0 | REG63 | 0x307C | |
| REG31 | 0 | REG62 | 0x3078 | |
| REG27 | 0 | REG61 | 0x3074 | |
| REG25 | 0 | REG60 | 0x3070 | |
| REG23 | 0 | REG59 | 0x306C | |
| REG21 | 0 | REG58 | 0x3068 | |
| REG19 | 0 | REG57 | 0x3064 | |
| REG18 | 0 | REG56 | 0x3060 | |
| REG17 | 0 | REG55 | 0x305C | |
| REG16 | 0 | REG54 | 0x3058 | |
| REG15 | 0 | REG53 | 0x3054 | REG31 |
| REG13 | 1 | REG52 | 0x3050 | |
| REG12 | 0 | REG51 | 0x304C | |
| REG10 | 0 | REG50 | 0x3048 | REG27 |
| REG7 | 1 | REG49 | 0x3044 | REG25 |
| REG6 | 1 | REG48 | 0x3040 | REG23 |
| REG5 | 1 | REG47 | 0x303C | REG21 |
| REG3 | 1 | REG46 | 0x3038 | REG19 |
| REG1 | 1 | REG45 | 0x3034 | REG18 |
| REG0 | 1 | REG44 | 0x3030 | REG17 |
| | 1 | REG43 | 0x302C | |
| | 0 | REG42 | 0x3028 | REG16 |
| | 1 | REG41 | 0x3024 | REG15 |
| | 1 | REG40 | 0x3020 | REG13 |
| | 1 | REG39 | 0x301C | REG12 |
| | 1 | REG38 | 0x3018 | REG10 |
| | 1 | REG37 | 0x3014 | REG7 |
| | 1 | REG36 | 0x3010 | REG6 |
| | 1 | REG35 | 0x300C | REG5 |
| | 1 | REG34 | 0x3008 | REG3 |
| | 1 | REG33 | 0x3004 | REG1 |
| | 1 | REG32 | 0x3000 | REG0 |

DESTINATION INDEX REGISTER
11111111110111100000000000000000
xFFDE0000 | x7BFF

FIG. 6

DMA-SCATTER AND GATHER OPERATIONS FOR NON-CONTIGUOUS MEMORY

PRIORITY

This application claims priority to U.S. Provisional Patent Application No. 62/864,719 filed Jun. 21, 2019, the contents of which are hereby incorporated in their entirety.

TECHNICAL FIELD

The present disclosure relates to memory management and, more particularly, to direct memory access (DMA) scatter and gather operations for non-contiguous memory.

BACKGROUND

DMA is a feature of computing systems that allows certain hardware subsystems to access main system memory (random-access memory) in a manner independent of the central processing unit (CPU). Without DMA, when the CPU is being utilized to receive and write data, or read and output data, it is typically fully occupied for the entire duration of the read or write operation, and is thus unavailable to perform other work. With DMA, the CPU first initiates the transfer by offloading the transfer to a DMA controller (DMAC), then the CPU performs other operations while the transfer is in progress, and the CPU finally receives an interrupt from the DMA controller when the operation is done. This feature is useful at any time that the CPU cannot keep up with the rate of data transfer, or when the CPU needs to perform work while waiting for a relatively slow I/O data transfer. Many hardware systems use DMA, including disk drive controllers, graphics cards, network cards and sound cards. DMA is also used for intra-chip data transfer in multi-core processors. Computers that have DMA channels can transfer data to and from devices with much less CPU overhead than computers without DMA channels. Similarly, a processing element inside a multi-core processor can transfer data to and from its local memory without occupying its processor time, allowing computation and data transfer to proceed in parallel.

DMA can also be used for "memory to memory" copying or moving of data within memory. DMA can offload expensive memory operations, such as large copies or scatter-gather operations, from the CPU to a dedicated DMA engine. An implementation example is the I/O Acceleration Technology available from Intel Corporation, Santa Clara, Calif. DMA is additionally of interest in network-on-chip and in-memory computing architectures.

DMA was developed to transfer contiguous blocks of memory at a time. When DMA is to be used to transfer only portions of a large block of memory, the DMA transfer may be broken down into individual DMA transfers to be performed sequentially. Inventors of embodiments of the present disclosure have discovered that this may require a significant quantity of descriptions for each different portion of the large block of memory to be transferred. Moreover, the descriptions themselves may be significantly large. The descriptions may be stored in system memory such as static random-access memory (SRAM) or dynamic access memory (DRAM). These descriptions may include, among other elements, a target address and a transfer count of continuous memory that is to be transferred. Thus, for each different contiguous block of memory to be read in the transfer, a description including all of these fields may be required. Accessing such descriptions in system memory for each contiguous block may be inefficient, and may be more inefficient the higher the number of individual contiguous blocks that are to be read for the complete transfer. Each descriptor must be accessed in system memory and multiple such descriptors might be read for a transfer of a relatively small amount of memory. Accesses to system memory may cause latency before a second transfer starts, decreasing the maximum amount of data that can be transferred within a given amount of time. Furthermore, each description may include multiple data structures, and each data structure that is read from system memory may further cause latency.

For example, in a memory bank of 32 registers, a DMA transfer might be configured to read the content of registers 0, 1, 3, 5, 6, 7, 10, 12, 13, 15, 16, 17, 18, 19, 21, 23, 25, 27, and 31. This might require eleven different descriptors, one each for registers {0, 1}, {3}, {5, 6, 7}, {10}, {12, 13}, {15, 16, 17, 18, 19}, {21}, {23}, {25}, {27}, and {31}. This results in eleven accesses of descriptors and, assuming four data structures per descriptor describing various aspects of the transfer, forty-four total accesses of system memory to read each descriptor to perform a DMA transfer on a memory bank of 32 registers. Inventors of embodiments of the present disclosure have discovered apparatuses, systems, and methods for DMA configuration that may address one or more of these issues.

SUMMARY

Embodiments of the present disclosure include a DMA controller that includes circuitry configured to load a DMA transfer descriptor configured to define which memory elements within a contiguous block of n memory elements are to be included in a given DMA transfer. The circuitry is further configured to, based on the DMA transfer descriptor, determine whether each memory element within the contiguous block of n memory elements is to be included in the given DMA transfer, including a determination that two or more non-contiguous sub-blocks of memory elements within the contiguous block of n memory elements are to be transferred. The circuitry is further configured to, based on the determination of whether each memory element within the contiguous block of n memory elements is to be included in the given DMA transfer, perform the DMA transfer of memory elements determined to be included within the given DMA transfer.

Embodiments of the present disclosure include a method for DMA control, including loading a DMA transfer descriptor, the DMA transfer descriptor defining which memory elements within a contiguous block of n memory elements are to be included in a given DMA transfer. The method includes, based on the DMA transfer descriptor, determining whether each memory element within the contiguous block of n memory elements is to be included in the given DMA transfer, including a determination that two or more non-contiguous sub-blocks of memory elements within the contiguous block of n memory elements are to be transferred. The method includes, based on the determination of whether each memory element within the contiguous block of n memory elements is to be included in the given DMA transfer, performing the DMA transfer of memory elements determined to be included within the given DMA transfer.

BRIEF DESCRIPTION OF THE DRAWINGS

FIG. 2 is an illustration of memory maps for different register banks, according to embodiments of the present disclosure.

FIG. 6 is an illustration of a DMA transfer descriptor as applied to memory maps for a write to non-contiguous blocks of memory, according to embodiments of the present disclosure.

DETAILED DESCRIPTION

Figure 1:
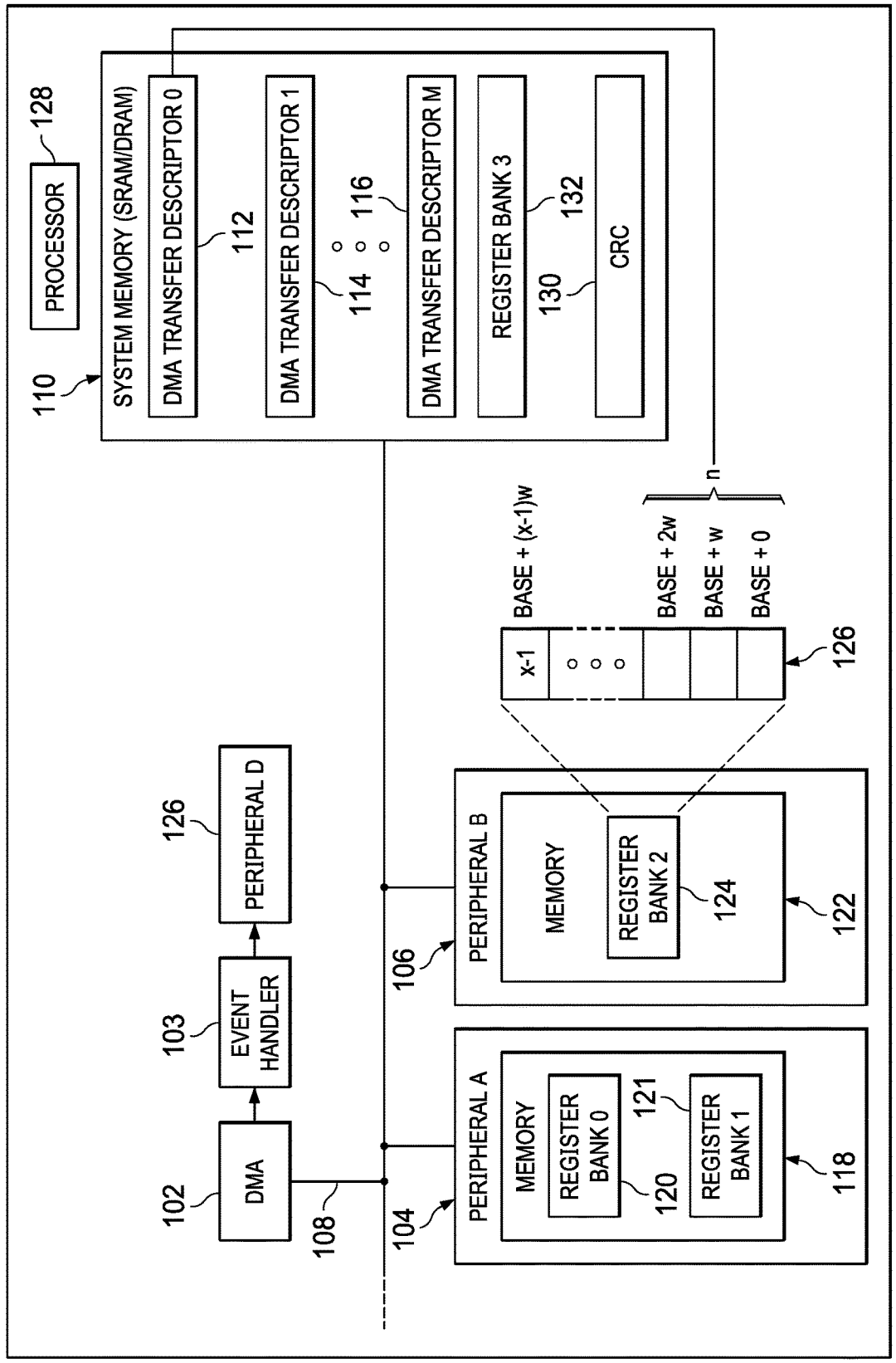
FIG. 1 is an illustration of a system for DMA-assisted memory access, according to embodiments of the present disclosure.

Embodiments of the present disclosure may include a DMA controller. The DMA controller may be implemented within any suitable electronic device or system, such as a computer, laptop, or microcontroller. The DMA controller may include circuitry implemented by analog circuitry, digital circuitry, instructions for execution by a processor, or any suitable combination thereof. The circuitry may be configured to load a first DMA transfer descriptor. The DMA transfer descriptor may be stored in a memory. The DMA transfer descriptor may be specific to a particular DMA controller. That is, to perform a given DMA transfer, the circuitry may load a specific set of DMA transfer descriptors. The DMA transfer descriptors may be implemented in any suitable manner, such as in a register, data structure, or other location in memory. The DMA transfer descriptors of a given set of descriptors for a given transfer may define which memory elements are to be included in the DMA transfer. In particular, the first DMA transfer descriptor may be configured to define which memory elements within a first contiguous block of n memory elements are to be included in a given DMA transfer. Other DMA transfer descriptors of the same set may be configured to define memory elements of other contiguous blocks of memory elements to be included in the given DMA transfer. The circuitry may be further configured to, based on the first DMA transfer descriptor, determine whether each memory element within the first contiguous block of n memory elements is to be included in the given DMA transfer, including a determination that a plurality of non-contiguous sub-blocks of memory elements within the first contiguous block of n memory elements are to be transferred. The circuitry may be further configured to, based on the determination of whether each memory element within the first contiguous block of n memory elements is to be included in the given DMA transfer, perform the DMA transfer of memory elements determined to be included within the given DMA transfer. The memory elements may be, for example, registers within a register bank.

In combination with any of the above embodiments, the DMA transfer descriptors may include a source address for a portion of the given DMA transfer. The DMA transfer descriptors may include a destination address for a portion of the given DMA transfer. The DMA transfer descriptors may include a source index register. The DMA transfer descriptors may include a destination index register. The DMA transfer descriptors may include an address of a next DMA transfer descriptor for the same given DMA transfer. The index registers may define what portions of the contiguous blocks of memory elements that are to be read from or written to for the given DMA transfer. The index registers may be n bits long. A designated bit or data within the n bits may specify whether additional DMA transfer descriptors are to be used. The other bits or data within the n bits may be used to identify whether a given memory element starting at the source or destination addresses are to be included in the transfer. Separate or same DMA transfer descriptors may be used for definitions of respective reads and writes for the GMA transfer. The source address and destination address might always be included within the DMA transfer, and not have representative data or bits in the index registers.

In combination with any of the above embodiments, the circuitry may be further configured to determine that additional memory elements are to be included in the given DMA transfer. The circuitry may be further configured to load a second DMA transfer descriptor. The second DMA transfer descriptor may be included in the set of transfer descriptors for the given DMA transfer. The second DMA transfer descriptor may be configured to define which memory elements within a second contiguous block of n memory elements are to be included in a given DMA transfer. The circuitry may be further configured to, based on the second DMA transfer descriptor, determine whether each memory element within the second contiguous block of n memory elements is to be included in the given DMA transfer, including a determination that a plurality of non-contiguous sub-blocks of memory elements within the second contiguous block of n memory elements are to be transferred. The circuitry may be further configured to, based on the determination of whether each memory element within the second contiguous block of n memory elements is to be included in the given DMA transfer, perform the DMA transfer of memory elements determined to be included within the given DMA transfer.

In combination with any of the above embodiments, the circuitry may be further configured to determine that additional memory elements are to be included in the given DMA transfer from information included in the first DMA transfer descriptor. The information may include a bit in a designated position of an index In combination with any of the above embodiments, the circuitry may be further configured to determine an address of the second DMA transfer descriptor from information included in the first DMA transfer descriptor. This may be defined in the first DMA transfer descriptor and may be indicated to be used by the bit in the designated position.

In combination with any of the above embodiments, the first and second contiguous blocks of n memory elements to be included in the given DMA transfer may be within a same peripheral. In combination with any of the above embodiments, the first and second contiguous blocks of n memory elements to be included in the given DMA transfer may be within a different peripheral.

In combination with any of the above embodiments, the first DMA transfer descriptor may be configured to define all of the plurality of non-contiguous sub-blocks within the first contiguous block of n memory elements that are to be transferred.

In combination with any of the above embodiments, the first DMA transfer descriptor may be further configured to define the plurality of non-contiguous sub-blocks of memory elements within the first contiguous block of n memory elements.

In combination with any of the above embodiments, the first DMA transfer descriptor may be further configured to define a first memory element within the first contiguous block of n memory elements to be included in the given DMA transfer by a base address of the first contiguous block of n memory elements.

In combination with any of the above embodiments, the first DMA transfer descriptor may be further configured to define one or more second memory elements within the first contiguous block of n memory elements to be included in the given DMA transfer by a plurality of indicators.

In combination with any of the above embodiments, the plurality of indicators may include a series of bits, each bit configured to indicate whether an associated memory element is to be included in the given DMA transfer.

In combination with any of the above embodiments, the series of bits may include n bits.

In combination with any of the above embodiments, one of the n bits may be configured to indicate that additional memory elements are to be included in the given DMA transfer.

In combination with any of the above embodiments, the first contiguous block of n memory elements to be included in the given DMA transfer may be within a register bank and the first contiguous block of n memory elements to be included in the given DMA transfer has a different base address than the register bank.

Embodiments of the present disclosure may include methods performed by any of the DMA controllers of the above embodiments.

Embodiments of the present disclosure may include an article of manufacture. The article of manufacture may include a non-transitory machine-readable medium. The medium. The medium may include instructions, the instructions, when read and executed by the processor, may perform the configurations of the circuitry of any of the embodiments of DMA controllers above.

FIG. 1 is an illustration of a system 100 for DMA-assisted memory access, according to embodiments of the present disclosure. System 100 may be configured to perform DMA-assisted peripheral configuration. Furthermore, system 100 may be configured to perform fault detection for memory or peripherals. System 100 may be implemented within any suitable context, such as a microcontroller, computer, laptop, smartphone, server, tablet, memory array, storage array, memory controller, or any other electronic device.

System 100 may include a DMA controller 102. DMA controller 102 may be implemented as a DMA controller circuit by analog circuitry, digital circuitry, instructions for execution by a processor (not shown), or any combination thereof. DMA controller 102 may be configured to perform DMA operations on behalf of any suitable portion of system 100, and to, or from, any suitable portion of system 100. DMA controller 102 may be configured to perform DMA-based transfers of content to, or from, any suitable memory within system 100.

System 100 may include a processor 128. DMA controller 102 may be configured to perform DMA transfers of content upon instruction from processor 128. Processor 128 may be configured to issue a DMA command to DMA controller 102 and perform other tasks in parallel while the DMA transfer has been offloaded to DMA controller 102 for completion. Upon finishing the DMA transfer, DMA controller 102 may issue an interrupt or other signal to processor 128 that the DMA transfer is finished, whether completed or halted by an error.

System 100 may include any suitable number and kind of peripherals. For example, system 100 may include peripheral A 104, peripheral B 106, or peripheral D 126. Peripherals 104, 106, 126 may implement, for example, controllers for general purpose input/output (GPIO), I²C communication, Universal Asynchronous Receiver/Transmitters (UART), serial protocol interface (SPI) communication, timers, counters, event counters, clocks, universal serial bus (USB) communication, phase-lock loop (PLL) operation, watch-dog timers, analog to digital conversion, digital to analog conversion, analog comparators, serial quad I/O (SQI), I2S communication, Ethernet (IEEE 802.3), graphics or graphics processing unit (GPU), cryptographic or encoding engines, random number generators, programmable cyclic redundancy check, controller area network (CAN), parallel master port, external bus interface, pulse-width modulation, external interrupts, numerically controlled oscillators, or complementary waveform generators. Although referenced as "peripherals", these peripherals may nonetheless be implemented on a same die or chip as processor 128.

System 100 may include a system memory 110. System memory 110 may be implemented in any suitable manner, such as by static random-access memory (SRAM) or dynamic random-access memory (DRAM). System 100 may include a DMA bus 108 configured to communicatively connect any suitable elements for DMA transfers and operations, such as DMA controller 102, peripherals 104, 106, and system memory 110. In some implementations (not shown), DMA bus 108 may be shared with processor 128. In such implementations, if both DMA controller 102 and processor 128 assert control over DMA bus 108 simultaneously, arbitration may be performed to determine which will use DMA bus 108 first.

DMA transfers may be performed by DMA controller 102 between any suitable elements of system 100 connected to DMA bus 108, such as between peripheral A 104, peripheral B 106, and system memory 110, or within such elements themselves. The memory contents to be read, written, or otherwise transferred may be stored in any suitable manner, such as in a DMA memory, register bank, cache, or buffer. For the examples of the present disclosure, contents to be read, written, or otherwise transferred by DMA controller 102 may be stored in an instance of a register bank 126. Any suitable number and kinds of instances of register bank 126 may be stored in system 100, such as in peripheral A 104 in a memory 118 therein, in peripheral B 106 in a memory 122 therein, or in system memory 110. For example, peripheral A 104 may include register bank 0 120 and register bank 1 121, peripheral B 106 may include register bank 2 124, and system memory 110 may include register bank 3 132.

Each instance of register bank 126 may be of any suitable size. However, each instance of register bank 126 to be accessed by DMA controller 102 for a given transfer may be of a same word size, denoted by w. Instances of register bank 126 may be implemented by a contiguous block of memory. The contiguous block of memory may be implemented by a quantity x of words, each of size w, beginning at a first address in the respective memory, the first address denoted as BASE. The size w may be typically 32 bits. Thus, an instance of register bank 126 may be a contiguous block of memory of x words of size w beginning at address BASE. Each word of an instance of register bank 126 may be referenced according to an index y with values from zero to (x−1). The address of each word of an instance of register bank 126 may thus be given as (BASE+y*w). Thus, an instance of register bank 126 may include contiguous words of size w at addresses BASE, (BASE+w), (BASE+2*w), . . . (BASE+(x−1)*w). Each instance of register bank 126, such as register banks 120, 121, 124, 132 may include a different number of words.

A given DMA transfer may require transferring content from multiple, distinct, contiguous blocks of memory. These multiple, distinct, contiguous blocks of memory may be of any size, including a single register or memory element. These multiple, distinct, contiguous blocks of memory may be non-contiguous sub-blocks of memory elements within a larger contiguous block of memory.

For example, a given DMA transfer may require transferring content that is spread across two separate register banks, such as register bank 0 120 and register bank 1 121 in peripheral A 104. In another example, a given DMA transfer might only involve certain memory sources or destinations from an individual register bank, or across multiple such register banks. One such transfer may be a DMA read in order to calculate a cyclical redundancy check (CRC) operation to verify memory contents. Such a verification may be performed to authenticate control, that data is the same as-was previously written, or for any other suitable purpose.

In one embodiment, system 100 may utilize each of DMA transfer descriptors 112, 114, 116 to identify which specific content within a contiguous block of n registers, words, or other memory units are to be read. A single instance of a DMA transfer descriptor may be sufficient to identify the specific content with the contiguous block of n registers, words, or other memory units to be read. Furthermore, a single such instance of a DMA transfer descriptor may be sufficient to identify the specific content within the contiguous block of n registers, words, or other memory units to be read regardless of how many distinct contiguous sub-blocks are to be read from block of n registers, words, or other memory units. In another embodiment, if additional content beyond the contiguous block of n registers, words, or other memory units are to be read for the same DMA transfer, additional instances of the DMA transfer descriptor may be used. Whether additional memory elements are to be included in the given DMA transfer beyond the original contiguous block of n registers, words, or other memory units may be defined by information included in the DMA transfer descriptor. An address of an additional instance of the DMA transfer descriptor may be included in the original or previous DMA transfer descriptor. Each such additional instance of the DMA transfer descriptor may in turn be configured to identify specific content within an additional contiguous block of n registers, words, or other memory units that are to be read as part of the same DMA transfer. Each such additional instance of the DMA transfer descriptor may be configured to identify further content within a same register bank or a different register bank as was used as a source or destination for the first instance of the DMA transfer. Any suitable number of DMA transfer descriptors may be used as would be needed to perform a given memory transfer, such as M DMA transfer descriptors. DMA transfer descriptors 112, 114, 116 may be stored in, for example, system memory 110.

For example, a given DMA transfer may be performed starting with register bank 2 124. DMA transfer descriptor 0 112 may specify what portions of a block of n contiguous registers, beginning at a base address, of register bank 2 124 are to be transferred. These portions of the block of n contiguous registers to be transferred may include two or more non-contiguous sub-blocks of memory elements within register bank 2 124. DMA transfer descriptor 0 112 may be sufficient to describe all portions of the block of n contiguous registers beginning at the base address of register bank 2 124 that are to be transferred, without reference or use of any other DMA transfer descriptor instances.

If additional portions of register bank 2 124 are to be read as part of the same given DMA transfer, or if additional portions of another register bank, such as register bank 0 120, are to be read as part of the same given DMA transfer, in one embodiment DMA transfer descriptor 0 112 may link to or reference another DMA transfer descriptor, such as DMA transfer descriptor 1 114. DMA transfer descriptor 1 114 may specify what portions of an additional n contiguous blocks, beginning at a base address, of a particular register bank to be read. The register bank to be read may be the same register bank 2 124, or a different register bank, such as register bank 0 120. The portions of such an additional block of n contiguous registers, beginning at a base address, of register bank 2 124, that are to be transferred may include two or more non-contiguous sub-blocks of memory elements. DMA transfer descriptor 1 114 may be sufficient to describe all portions of the block of n contiguous registers beginning at the base address of this additional block of n contiguous registers that are to be transferred, without reference or use of any other DMA transfer descriptor instances. Thus, an instance of a DMA transfer descriptor may be sufficient to describe all portions of a given block of n contiguous registers, but additional DMA transfer descriptors may be needed to describe portions of further blocks of n contiguous registers that are to be included in the transfer.

FIG. 2 is an illustration of memory maps for different register banks, according to embodiments of the present disclosure. Illustrated are register banks 202, 204, 206. Register banks 202, 204, 206 may each implement any of the register banks of FIG. 1, and are presented to illustrate possible implementations of register banks of FIG. 1.

Register bank 202 may include a register bank with 32 registers, wherein each register is implemented by an individual word. The registers of register bank 202 may be enumerated from REG0, located at a base address of 0x00, consecutively in a contiguous block, through REG31, located at an address of 0x7C.

Register bank 204 may also include a register bank with 32 registers, wherein each register is implemented by an individual word. The registers of register bank 204 may be enumerated from REG32, located at a base address of 0x3000, consecutively in a contiguous block, through REG63, located at an address of 0x307C.

Register bank 206 may include a register bank with 64 registers, wherein each register is implemented by an individual word. The registers of register bank 204 may be enumerated from REG100, located at a base address of 0x2000, consecutively in a contiguous block, through REG163, located at an address of 0x20FC.

The contiguous block of a n registers or words to be read in a given register bank identified by a DMA transfer descriptor may begin at any suitable portion of a register bank, and not necessarily at the base address of the register bank. For example, n registers or words may be read from register bank 202 starting at address 0x00. Inventors of embodiments of the present disclosure have discovered that it may be useful to implement n as the most common size of register banks. For example, if n is 32, then the entire contiguous block of 32 registers in register bank 202 starting at address 0x00 may be selectively parsed for a DMA transfer operation. However, if the first register to be read is instead REG 4 at 0x10, then the range of registers (from which transfers may be made) defined by n may exceed the remaining registers contiguously available in register bank 202. If the range of registers defined by n exceeds the remaining registers contiguously available in the register bank, then portions of the range that exceed the remaining available registers may be ignored.

As discussed above, once the content from a contiguous block of n registers or words to be read in a given DMA transfer have been read, if more content is to be read for the given DMA transfer, then another contiguous block of n registers or words from which content may be selectively read may specified. For example, if up to n registers or words may be selectively read from register bank 204 starting at address 0x00, then up to another n registers or words may be selectively read from register bank 204 starting at, for example, address 0x3000 in register bank 204. In another example, if up to n registers or words may be selectively read from register bank 206 starting at address 0x2000 in register bank 206, then up to another n registers or words may be selectively read from register bank 206 starting at, for example, address 0x2080 in register bank 206.

Figure 3:
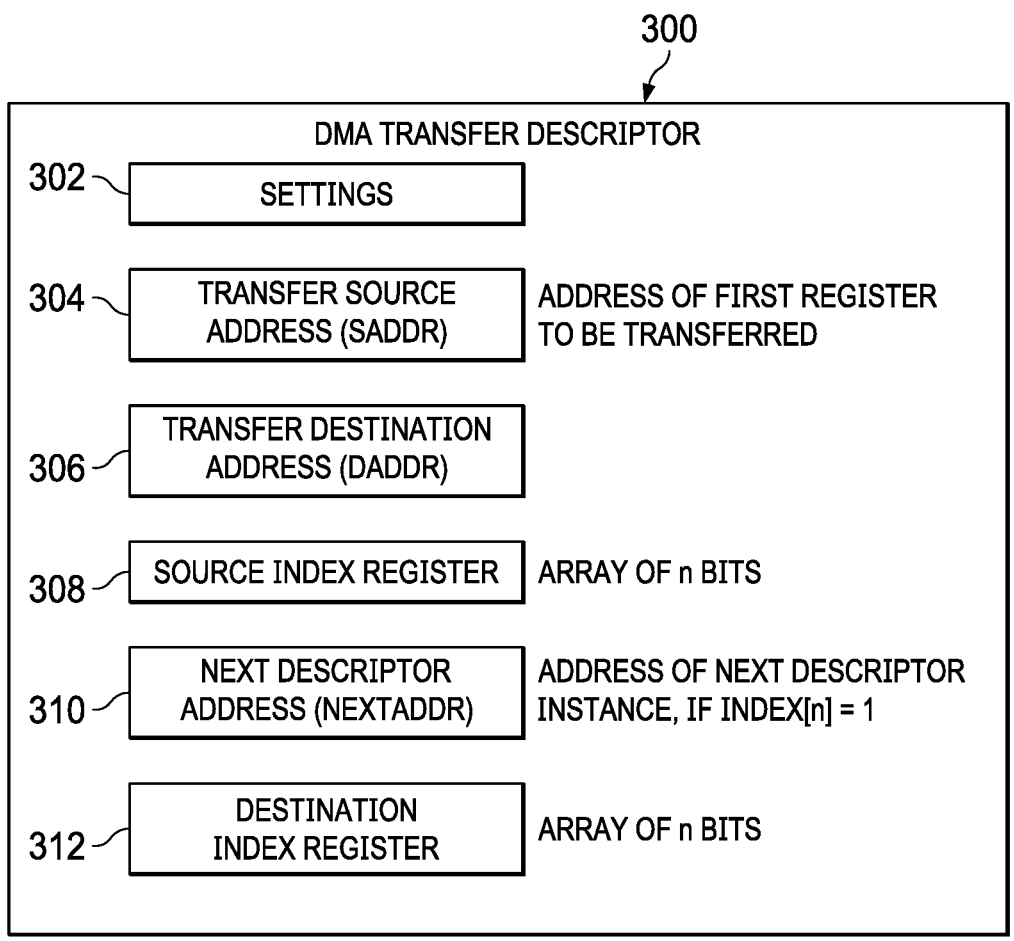
FIG. 3 is a more detailed illustration of a DMA transfer descriptor, according to embodiments of the present disclosure.

FIG. 3 is a more detailed illustration of a DMA transfer descriptor 300, according to embodiments of the present disclosure. DMA transfer descriptor 300 may implement, fully or in part, DMA transfer descriptors 112, 114, 116. In one embodiment, DMA transfer descriptor 300 may define which registers or elements from a contiguous block of n registers or memory elements are to be included within a given DMA transfer. In another embodiment, DMA transfer descriptor 300 may define whether there are any more such blocks of n registers or memory elements include for the given DMA transfer. In a further embodiment, DMA transfer descriptor 300 may define a location for other DMA transfer descriptor instances for additional blocks of n registers or memory elements included for the given DMA transfer.

DMA transfer descriptor 300 may include various settings 302 that define, for example, how many registers or words that are to be evaluated whether to be transferred (such as n), whether the transfer is a read or a write, whether scatter/gather operations are enabled, whether a particular kind of CRC operation is to be used, seed values for CRC operations, selection of a particular CRC polynomial, whether CRC checks are to be performed during reads and writes or at the completion of reads and writes, data against which a CRC check is to be made, or any other suitable control settings that are to be used in performing a DMA transfer. Settings 302 may be implemented in any suitable manner, such as by a register or other suitable data structure.

DMA transfer descriptor 300 may include a transfer source address (SADDR) 304, which may define an address of a first register to be transferred as part of the DMA transfer. The address may be defined for example, in terms of peripheral, memory location, or memory address. In one embodiment, the register at the address identified by SADDR 304 might always be included in the DMA transfer, while all other registers within the block of n defined in the contiguous block of memory might be selectively and optionally included in the DMA transfer, responsive to source index register 308 to be described below. SADDR 304 may be implemented in any suitable manner, such as by a register or other suitable data structure.

DMA transfer descriptor 300 may include a transfer destination address (DADDR) 306, which may define an address to where the DMA transfer is to be written. The address may be defined for example, in terms of peripheral, memory location, or memory address. DADDR 306 may be implemented in any suitable manner, such as by a register or other suitable data structure.

DMA transfer descriptor 300 may include one or more indicators, to define portions of the contiguous block of n registers or memory locations identified by DMA transfer descriptor 300 that are to be included in the DMA transfer. The plurality of indicators may be implemented as an array or series of bits, a decimal (reflecting a series of bits), hexadecimal (reflecting a series of bits), or binary value (reflecting a series of bits), a register, or any other suitable data structure or mechanism. In one embodiment, a source index register 308 may be used to define portions of the contiguous block of memory that are to be included as sources of the DMA transfer. In another embodiment, a destination index register 312 may be used to define portions of the contiguous block of memory that are to be included as a destination of the DMA transfer.

Source index register 308 may define portions of the contiguous block of n registers or memory locations identified by DMA transfer descriptor 300 that are to be read from as part of the DMA transfer. In one embodiment, source index register 308 may include n entries. In a further embodiment, source index register 308 may include entries for (n−1) registers or memory locations of the contiguous block of n registers or memory locations identified by DMA transfer descriptor that are to be read from in the DMA transfer. In such a further embodiment, the remaining entry, i.e. entry n, may define whether or not the DMA transfer is to include additional registers or memory elements beyond the contiguous block of n registers or memory locations identified by DMA transfer descriptor 300 that are to be included in the DMA transfer. In such a further embodiment, source index register 308 might not include an entry for the first register or memory element to be read in the DMA transfer. The first register or memory element to be read in the DMA transfer may be assumed or implied to be the register or memory element defined by SADDR 304. Thus, the DMA transfer might always include the register or memory element defined by SADDR 304.

For DMA reads, if the contents of source index register 308 at location i are set to one (index[i]=1), the next address to be accessed in the DMA read may be calculated by DMA controller to be (SADDR+w*(1+i)). Examples shown in FIGS. 4 and 5 below may use DMA reads as an example operation, but these examples shown in FIGS. 4 and 5 may also be applied to DMA writes as an example operation. DMA reads and DMA writes might utilize separate instances of DMA transfer descriptor 300. The use of source index register 308 may supplant the use of counters used in other solutions.

Destination index register 312 may define portions of the contiguous block of n registers or memory locations identified by DMA transfer descriptor 300 that are to be written to in the DMA transfer. In one embodiment, destination index register 312 may include n entries. In a further embodiment, destination index register 312 may include entries for (n−1) registers or memory locations of the contiguous block of n registers or memory locations identified by DMA transfer descriptor that are to be included in the DMA transfer. In such a further embodiment, the remaining entry, i.e. entry n, may define whether or not the DMA transfer is to include additional registers or memory elements beyond the contiguous block of n registers or memory locations identified by DMA transfer descriptor 300 that are to be included in the DMA transfer. In such a further embodiment, destination index register 312 might not include an entry for the first register or memory element to be written to in the DMA transfer. The first register or memory element to be included in the DMA transfer may be assumed or implied to be the register or memory element defined DADDR 306. Thus, the DMA transfer might always include the register or memory element defined by DADDR 306. In one embodiment, if destination index register 312 includes a "1" in entry n, then source index register 308 may also include a "1" in entry n, and vice-versa. In another embodiment, if destination index register 312 includes a "1" in entry n, but there are no more source registers to be read, source index register 308 may include a "0" in entry n, and source addresses in the subsequent descriptor may be ignored. In yet another embodiment, if destination index register 312 includes a "0" in entry n, but there are more source registers to be read, source index register 308 may include a "1" in entry n, and destination addresses in the subsequent descriptor may be ignored.

For DMA writes, the next address to be accessed in the DMA read may be calculated by DMA controller to be (DADDR+w*(1+i)). The use of source index register 308 may supplant the use of counters used in other solutions.

DMA transfer descriptor 300 may include a next descriptor address (NEXTADDR) 310. NEXTADDR 310 may be implemented in any suitable manner, such as by a register or other suitable data structure. NEXTADDR 310 may define an address, register, or other location of a next instance of DMA transfer descriptor 300 that is to define portions of an additional block of n contiguous registers or memory locations that are to be included in the same DMA transfer.

In an alternative embodiment, the DMA transfer might not include the register or memory location defined at SADDR 304 or DADDR 306. In such an alternative embodiment, source index register 308 might include entries for all n registers or memory locations of the contiguous block of n registers or memory locations identified by DMA transfer descriptor 300 that are to be included in the DMA transfer. In such an alternative embodiment, source index register 308 might not include an entry defining whether or not the DMA transfer is to include additional registers or memory elements beyond the contiguous block of n registers or memory locations identified by DMA transfer descriptor 300. Such an entry may be used instead to define whether the data at the first entry, corresponding to the base address, is to be included in the transfer. In such an alternative embodiment, whether or not the DMA transfer is to include additional registers or memory elements beyond the contiguous block of n registers or memory locations identified by DMA transfer descriptor 300 that are to be included in the DMA transfer may be defined by the content of NEXTADDR 310. In such an alternative embodiment, if NEXTADDR 310 is a known null value, then the DMA transfer might not include additional registers or memory elements. If NEXTADDR 310 includes an address value, then the DMA transfer might include additional registers or memory elements, such additional registers or memory elements to be defined by another instance of DMA transfer descriptor 300 at the address specified in NEXTADDR 310.

In one embodiment, if a write and a read of the transfer are to be made to non-contiguous blocks of memory, the specification of such a write and read may be included on the same instance of DMA transfer descriptor 300. In another embodiment, if a write and a read of the transfer are to be made to non-contiguous blocks of memory, the specification of such a write and read may be included on the separate instances of DMA transfer descriptor 300.

Figure 4:
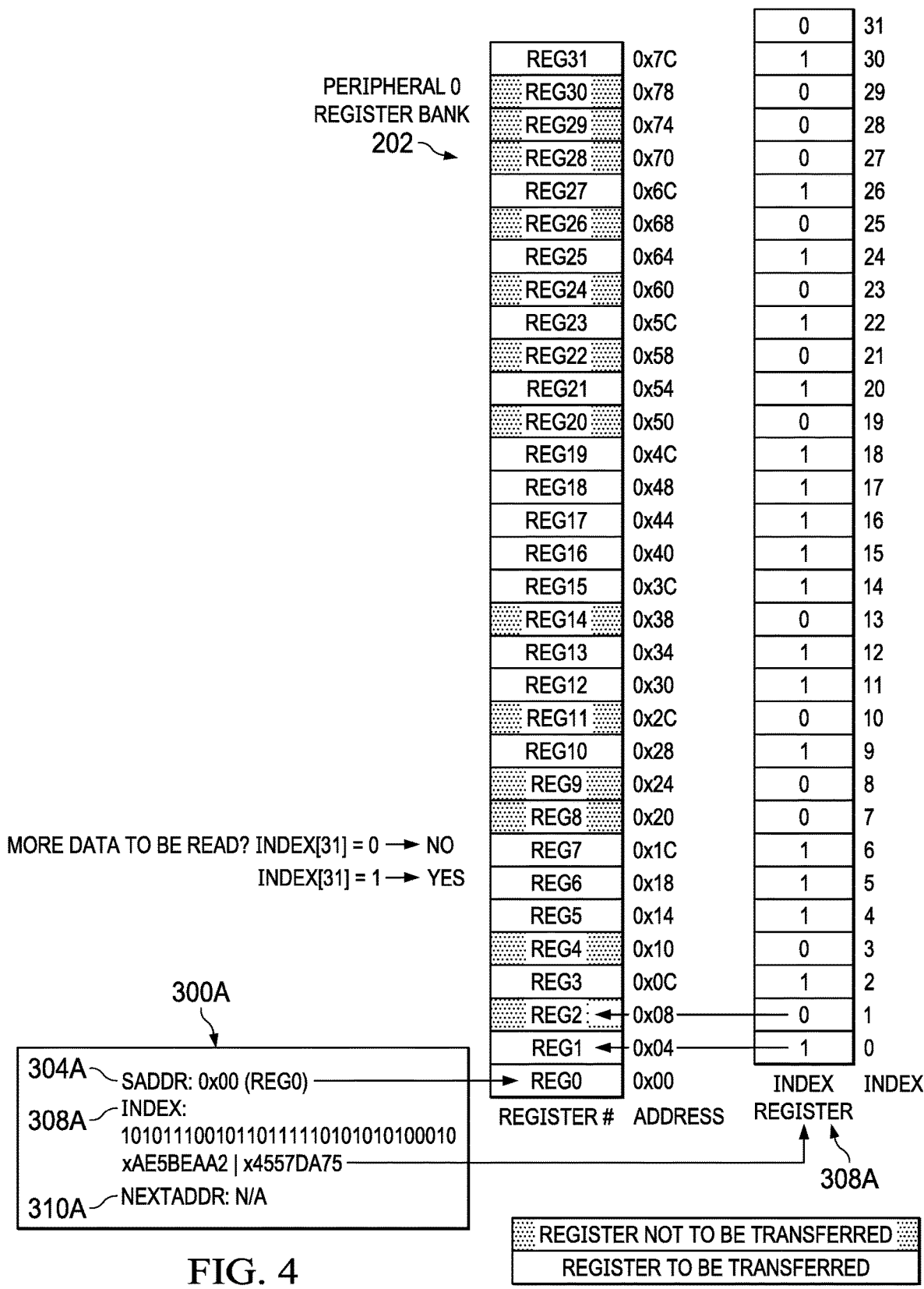
FIG. 4 is an illustration of a DMA transfer descriptor as applied to a memory map of a register bank, according to embodiments of the present disclosure.

FIG. 4 is an illustration of a DMA transfer descriptor as applied to a memory map of a register bank, according to embodiments of the present disclosure.

Illustrated in FIG. 4 is an example implementation of register bank 202 with 32 registers, each the size of a word, enumerated from REG0 to REG31 beginning at address 0x00 in, for example, a peripheral denoted as peripheral 0. This may represent, for example, peripheral A 104, register bank 1 121. In the example of FIG. 4, n, the number of contiguous registers or memory elements which the DMA transfer may include, may be 32, the same size as register bank 202.

An instance of DMA transfer descriptor 300 is shown as DMA transfer descriptor 300A. DMA transfer descriptor 304A may include an instance of SADDR 304, denoted as SADDR 304A, defining that the first register to be transferred in the DMA transfer is REG0 of peripheral 0, register bank 202, at address 0x00.

Graphically, contents of register bank 202 that are to be included in the DMA transfer are represented without shading, and contents of register bank 202 that are not be included in the DMA transfer are represented with shading. In the example of FIG. 4, REG0, REG1, REG3, REG5, REG6, REG7, REG10, REG12, REG13, REG15, REG16, REG17, REG18, REG19, REG21, REG23, REG25, REG27, and REG31 are to be included in the DMA transfer.

DMA transfer descriptor 304A may include an instance of source index register 308, denoted as source index register 308A, defining which portions of the n contiguous registers of register bank 202 that are to be included in the DMA transfer. In one embodiment, source index register 308A might not include an entry for REG0 at address 0x00, as this address is defined as the source address SADDR 304A, and will be automatically included in the DMA transfer. Source index register 308A may be represented as an array of n bits, and in the example of FIG. 4, 32 bits. The 32 bits may be indexed starting at an index of zero. The first bit of source index register 308A at index zero (index[0]) may define whether REG1 is to be included in the DMA transfer. This first bit may be set, i.e. have a value of one, as REG1 is to be included in the DMA transfer. DMA controller 102, upon reading this bit, may read REG1 at address 0x04 as part of the DMA transfer. A next bit of source index register 308A at index one (index[1]) may define whether REG2 is to be included in the DMA transfer. This first bit may be set to zero, i.e., not set or cleared, as REG2 is not to be included in the DMA transfer. In various implementations, a "0" bit may indicate instead that the associated register is not to be included in the DMA transfer, and a "1" bit may indicate that the associated register is to be included in the DMA transfer.

The last bit of source index register 308A at index n (index[n] or index[31]) may define whether or not there is to be additional content included in the DMA transfer. If, for example, this bit is set, then additional content may be included in the DMA transfer, defined by another instance of DMA transfer descriptor 300 located at an addressed defined by NEXTADDR 310A. Otherwise, this bit may be clear. In various implementations, a cleared bit may indicate instead that there is additional content to be included in the DMA transfer, and a set bit may indicate that there is no additional content to be included in the DMA transfer. In the example of FIG. 4, there might be no additional content to be included in the DMA transfer, and source index register 308A may have a cleared bit at index[31].

As REG0, REG1, REG3, REG5, REG6, REG7, REG10, REG12, REG13, REG15, REG16, REG17, REG18, REG19, REG21, REG23, REG25, REG27, and REG31 are to be included in the DMA transfer, and no additional content is to be included, source index register 308A may include data entries, starting with REG0, of {1 0 1 0 1 1 1 0 0 1 0 1 1 0 1 1 1 1 1 0 1 0 1 0 1 0 1 0 0 0 1 0}. This may be stored, least significant bit (LSB) first, as a register value of xAE5BEAA2. If stored most significant bit (MSB) first, it may be stored as a register value of x4557DA75.

FIG. 1 is an illustration of a system 100 for DMA-assisted memory access, according to embodiments of the present disclosure. FIG. 2 is an illustration of memory maps for different register banks, according to embodiments of the present disclosure. Illustrated FIG. 3 is a more detailed illustration of a DMA transfer descriptor 300, according to embodiments of the present disclosure. FIG. 4 is an illustration of a DMA transfer descriptor as applied to a memory map of a register bank, according to embodiments of the present disclosure.

Figure 5:
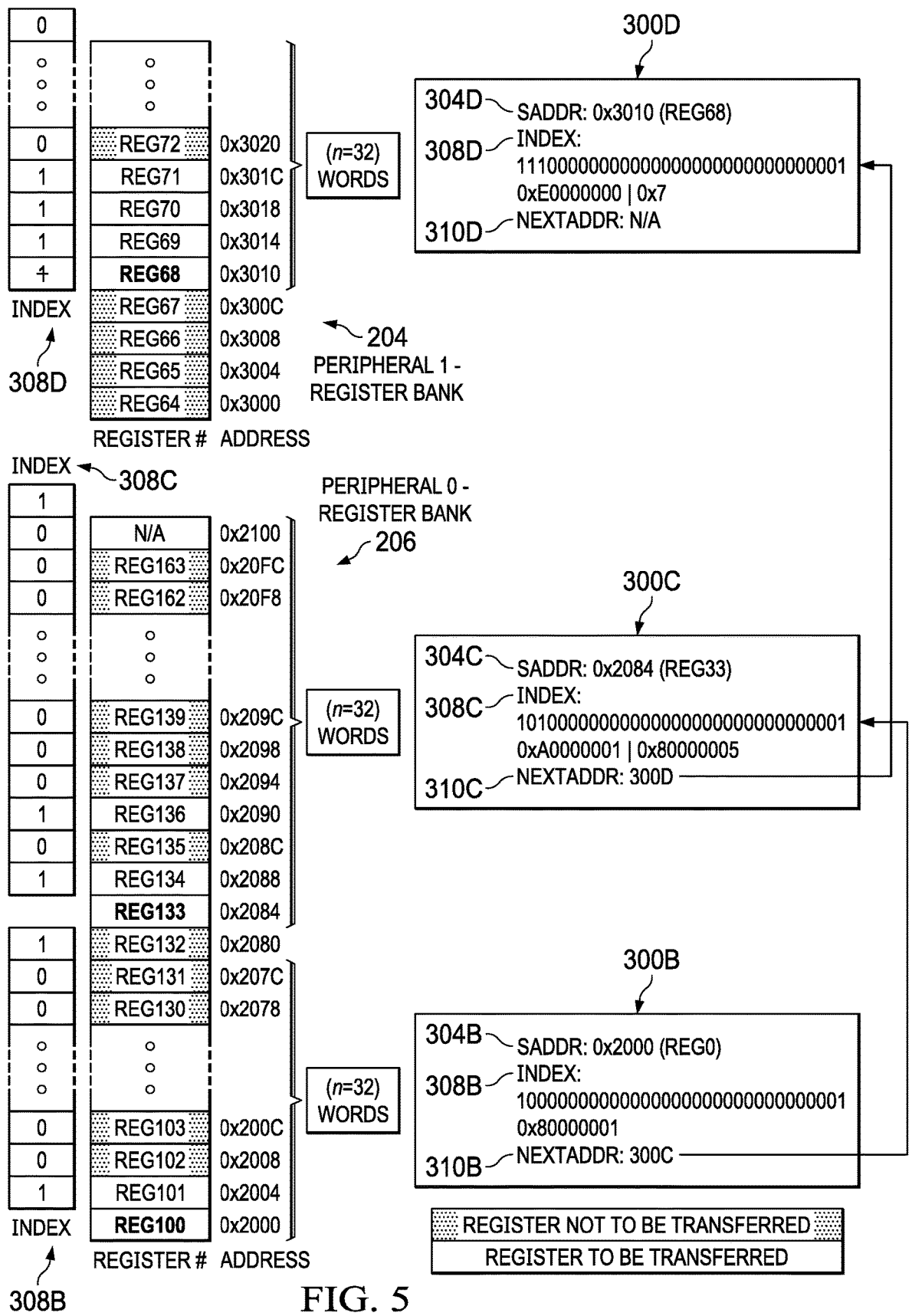
FIG. 5 is an illustration of other DMA transfer descriptors as applied to memory maps of register banks, according to embodiments of the present disclosure.

FIG. 5 is an illustration of other DMA transfer descriptors as applied to memory maps of register banks, according to embodiments of the present disclosure. In particular, FIG. 5 illustrates examples wherein additional content is to be included in a DMA transfer beyond content identified by a first instance of DMA transfer descriptor 300, and wherein such additional content is within a same or different register bank.

Illustrated in FIG. 5 is an example implementation of register bank 206 with 64 registers, each the size of a word, enumerated from REG100 to REG163 beginning at address 0x2000 in, for example, peripheral 0. This may represent, for example, peripheral A 104, register bank 0 120. Also illustrated is an example implementation of register bank 204 with 32 registers, each the size of a word, enumerated from REG64 to REG72 beginning at address 0x3000 in, for example, peripheral 1. This may represent, for example, peripheral B 106, register bank 2 124. In the example of FIG. 5, n, the number of contiguous registers or memory elements which the DMA transfer may include as defined by a single instance of DMA transfer descriptor 300, may be 32, the same size as register bank 204.

Graphically, contents of register banks 204, 206 that are to be included in the DMA transfer are represented without shading, and contents of register banks 204, 206 that are not to be included in the DMA transfer are represented with shading. In the example of FIG. 5, REG100, REG101, REG133, REG134, REG136, REG68, REG69, REG70, and REG71 are to be included in the DMA transfer.

An instance of DMA transfer descriptor 300 is shown as DMA transfer descriptor 300B, which may be a first DMA transfer descriptor 300 instance to represent a given DMA transfer. SADDR 304B of DMA transfer descriptor 300B may specify that the DMA transfer is to include a register in peripheral 0, register bank 206 at address 0x2000, given as REG100. Thus, DMA transfer descriptor 300B may define which of n (32) contiguous registers are to be included in the DMA transfer, beginning with REG100 at address 0x2000 in register bank 206. This may specify which of registers in the address range 0x2000-0x207C are to be included.

Notably, in FIG. 5, REG132 at address 0x2080 is not included in any groups of n registers defined by instances of DMA transfer descriptor 300, even though REG132 is the (n+1) register in register bank 206, and more than one block of n registers of register bank 206 are to be used for the DMA transfer.

DMA transfer descriptor 300B may include source index register 308B, which may specify in a bit in at index[0] that REG101, the first register after REG100, is to be included in the DMA transfer. No other registers within the n registers defined by DMA transfer descriptor 300B might be included in the DMA transfer. Thus, associated bits for these other registers might not be programmed. The last element of source index register 308B (index[31]) may be programmed, as additional content is to be transferred by the DMA transfer as defined by other instances of DMA transfer descriptor 300. Accordingly, source index register 308B may be given by the set of values {1 0 0 0 0 0 0 0 0 0 0 0 0 0 0 0 0 0 0 0 0 0 0 0 0 0 0 0 0 0 0 1}. This may be stored, LSB first or MSB first, as a register value of 0x80000001.

Notably, although index[31] of source index register 308B is set, whether the register that would otherwise correspond to the $32^{nd}$ register, REG133, is irrelevant to index[31] of source index register 308B as REG133 is beyond the scope of the n contiguous registers or memory elements to be addressed by DMA transfer descriptor 300B.

DMA transfer descriptor 300B may include NEXTADDR 310B, which may specify that the next instance of DMA transfer descriptor 300 to be used for the DMA transfer is DMA transfer descriptor 300C.

DMA transfer descriptor 300C may be a second instance of DMA transfer descriptor 300 to represent the given DMA transfer. SADDR 304C of DMA transfer descriptor 300C may specify that the DMA transfer is to include additional content from the same register bank in peripheral 0, register bank 206, at address 0x2084, given as REG133. Again, REG132 might not be included in the description of any instances of DMA transfer descriptor 300 as it is not to be included in the DMA transfer, was outside the boundaries covered by DMA transfer descriptor 300B, and SADDR 304C identifies registers beginning at REG133 to be transferred. Thus, SADDR 304C identifies REG133 at 0x2084, rather than REG132 at 0x2080. DMA transfer descriptor 300C may define which of n (32) contiguous registers are to be included in the DMA transfer, beginning with REG133 at address 0x2084 in register bank 206. This may specify which of registers in the address range 0x2084-0x2100 are to be included in the DMA transfer.

As shown in FIG. 5, this address range, 0x2084-0x2100, may extend past the actual limits of register bank 206. In such a case, DMA controller 102 may be configured to ignore any indications of DMA transfers for such addresses which extend past the actual limits of register bank 206. This may be accomplished by clearing bits in source index register 308C associated with such addresses past the actual limits of register bank 206.

DMA transfer descriptor 300C may include source index register 308C, which may specify in a bit in at index[0] that REG134, the first register after REG133, is to be included in the DMA transfer. Furthermore, source index register 308C may specify in a bit in at index[2] that REG136, the third register after REG133, is to be included in the DMA transfer. No other registers within the n registers defined by DMA transfer descriptor 300C might be included in the DMA transfer. Thus, associated bits for these other registers might not be set. The last element of source index register 308C (index[31]) may be set, as additional content is to be transferred by the DMA transfer as defined by other instances of DMA transfer descriptor 300. Accordingly, source index register 308C may be given by the set of values {1 0 1 0 0 0 0 0 0 0 0 0 0 0 0 0 0 0 0 0 0 0 0 0 0 0 0 0 0 0 0 1}. This may be stored, LSB first as a register value of 0xA0000001, or MSB first, as a register value of 0x80000005.

DMA transfer descriptor 300C may include NEXTADDR 310C, which may specify that the next instance of DMA transfer descriptor 300 to be used for the DMA transfer is DMA transfer descriptor 300D.

DMA transfer descriptor 300D may be a third instance of DMA transfer descriptor 300 to represent the given DMA transfer. SADDR 304D of DMA transfer descriptor 300D may specify that the DMA transfer is to include additional content from a different register bank, located in peripheral 1, i.e., register bank 204, at address 0x3010, given as REG68. As shown in FIG. 5, peripheral 1, register bank 204 might not begin with address 0x3010, but instead address 0x3000. Thus, the n contiguous registers or memory elements to be described by DMA transfer descriptor 300D might not include addresses 0x3000 through 0x300C (REG64-REG67), but may begin instead with address 0x3010 (REG68).

DMA transfer descriptor 300D may include source index register 308D, which may specify in bits at index[0]-index[2] that REG69, REG70, and REG71, the first three registers after REG68, are to be included in the DMA transfer. No other registers within the n registers defined by DMA transfer descriptor 300D might be included in the DMA transfer. Thus, associated bits for these other registers might not be set. The last element of source index register 308D (index[31]) may be cleared, as the DMA transfer is not to include additional content. Accordingly, source index register 308D may be given by the set of values {1 1 1 0 0 0 0 0 0 0 0 0 0 0 0 0 0 0 0 0 0 0 0 0 0 0 0 0 0 0 0 0}. This may be stored, LSB first as a register value of 0xE0000000, or MSB first, as a register value of 0x7.

DMA transfer descriptor 300D may include NEXTADDR 310D, which may be a null value or unused, as there may be no more instances of DMA transfer descriptor 300 to be used for the given DMA transfer.

Returning to FIG. 1, there may be thus as many DMA transfer descriptor instances for a given DMA transfer as there are contiguous blocks of registers of up to size n that are to be accessed to read content for the given DMA transfer.

System 100 may be used to implement DMA scatter/gather operations, wherein various contiguous and non-contiguous registers from one or more register banks are read to determine information. The DMA scatter/gather operations may be performed to prevent or detect fault injections or fault errors, perform on-the-fly static peripheral configuration checks using built-in DMA CRC-type capabilities, generate events in case of fault detection, as a source for zeroization circuitry, as a source for fault trigger actions to put system 100 in a safe state, configure a peripheral during boot without CPU intervention, or copy and restore peripheral configuration to or from memory retained in deep sleep, hibernate, or other sleep modes. These DMA scatter/gather operations may be performed using DMA transfer descriptors such as DMA transfer descriptors 112, 114, 116 in order to perform such operations more efficiently.

For example, DMA controller 102 may receive a command to transfer data to or from a peripheral, such as from peripheral A 104 to system memory 110. DMA controller 102 may read DMA transfer descriptor 0 112 to identity what portions of a first group of up to n contiguous blocks of registers in register bank 0 120 are to be transferred. DMA controller 102 may transfer subsequent DMA transfer descriptors from system memory 110, such as DMA transfer descriptor 1 114 to identity what portions of a second group of n contiguous blocks of registers, whether in register bank 0 120 or in other register banks, are to be transferred. Upon reading from a DMA transfer descriptor that no further DMA transfer descriptors are to be transferred, the transfer of data for the DMA transfer may be completed.

Before, during, or upon completion of the DMA transfer, but before any results are committed, finalized, or otherwise completed, system 100 may perform any suitable check. For example, DMA controller 102 may be configured to perform checks on data values written to, or read from, the register banks. Such checks may include CRC checks. A value to be written, or read from the register may be compared to a known or expected value. The known or expected value may be stored in, for example, SRAM, such as CRC 130, and may be determined, calculated, or read by DMA controller 102. If the value actually written or read as part of the DMA transfer does not match the expected value stored in CRC 130, DMA controller 102 may be configured to take any suitable corrective action. For example, DMA controller 102 may be configured to issue an error event to an event handler 103. Event handler 103 may be implemented with analog circuitry, digital circuitry, instructions for execution by a processor, or any suitable combination thereof. Event handler 103 may be configured to, upon notice of the error from DMA controller 102, generate an action, interrupt, or other suitable signal to one or more portions of system 100, such as processor 128, the peripheral to or from which the erroneous data transfer arose, or a specialized error handler peripheral such as peripheral D 126. Any suitable corrective action may be taken, such as actions defined in software, incrementing a counter (wherein a value of the counter above a given threshold may cause other corrective actions), clearing keys, zeroization, or restarting operation.

FIG. 6 is an illustration of a DMA transfer descriptor as applied to memory maps for a write to non-contiguous blocks of memory, according to embodiments of the present disclosure. FIGS. 4 and 5 illustrate principles of DMA transfer of non-contiguous blocks of memory that may be applied to reading from non-contiguous blocks of memory or to writing to non-contiguous blocks of memory. FIG. 6 may illustrate a specific case of writing to non-contiguous blocks of memory.

At the end of FIG. 4, certain memory locations may have been read from peripheral 0 register bank 202 as specified by source index register 308A. In FIG. 6, these are shown conceptually in 602. These may be written to memory starting at DADDR, or 0x3000 of another instance 604 of peripheral 1 register bank in the example of FIG. 6.

An instance of destination index register 312A is shown. Graphically, contents of register bank 604 that are to be written to in the DMA transfer are represented without shading, and contents of register bank 604 that are not be written to in the DMA transfer are represented with shading. In the example of FIG. 6, REG32, REG33, REG34, REG35, REG36, REG37, REG38, REG39, REG40, REG41, REG42, REG44, REG45 REG46, REG47, REG48, REG49, REG50, and REG53 are to be written to in the DMA transfer. Destination index register 312A may define which portions of the n contiguous registers of register bank 604 that are to be written to in the DMA transfer. In one embodiment, destination index register 312A might not include an entry for REG32 at address 0x3000, as this address is defined as the destination address DADDR, and will be automatically written to in the DMA transfer. Destination index register 312A may be represented as an array of n bits, and in the example of FIG. 6, 32 bits. The 32 bits may be indexed starting at an index of zero. The first bit of destination index register 312A at index zero (index[0]) may define whether REG33 is to be written to in the DMA transfer. This first bit may be set, i.e., have a value of one, as REG33 is to be written to in the DMA transfer. DMA controller 102, upon reading this bit, may write to REG33 at address 0x3004 as part of the DMA transfer. Another bit of destination index register 312A at index ten (index[10]) may define whether REG43 is to be written to in the DMA transfer. This bit may be set to zero, i.e., not set or cleared, as REG43 is not to be written to in the DMA transfer. In various implementations, a "0" bit may indicate instead that the associated register is not to be included in the DMA transfer, and a "1" bit may indicate that the associated register is to be included in the DMA transfer.

The last bit of destination index register 312A at index n (index[n] or index[31]) may define whether or not there is to be additional content to be written to DMA transfer. If, for example, this bit is set, then additional content may be written to the DMA transfer, defined by another instance of DMA transfer descriptor 300 located at an address defined by NEXTADDR 310A. Otherwise, this bit may be clear. In various implementations, a cleared bit may indicate instead that there is additional content to be written to in the DMA transfer, and a set bit may indicate that there is no additional content to be written to in the DMA transfer. In the example of FIG. 6, there might be no additional content to be written to in the DMA transfer, and destination index register 312A may have a cleared bit at index[31].

As REG0, REG1, REG3, REG5, REG6, REG7, REG10, REG12, REG13, REG15, REG16, REG17, REG18, REG19, REG21, REG23, REG25, REG27, and REG31 are to be written to the locations REG32, REG33, REG34, REG35, REG36, REG37, REG38, REG39, REG40, REG41, REG42, REG44, REG45 REG46, REG47, REG48, REG49, REG50, and REG53, and no additional content is to be included, destination index register 312A may include data entries, starting with REG33, of {1 1 1 1 1 1 1 1 1 1 0 1 1 1 1 1 1 0 0 1 0 0 0 0 0 0 0 0 0 0 0 0}. This may be stored, least significant bit (LSB) first, as a register value of xFFDE0000. If stored most significant bit (MSB) first, it may be stored as a register value of x7BFF.

Shown in FIG. 6 are the contents after the DMA write to the respective registers of register bank 604. Contents that were not written to may be maintained, and their values are not illustrated in FIG. 6.

Figure 7:
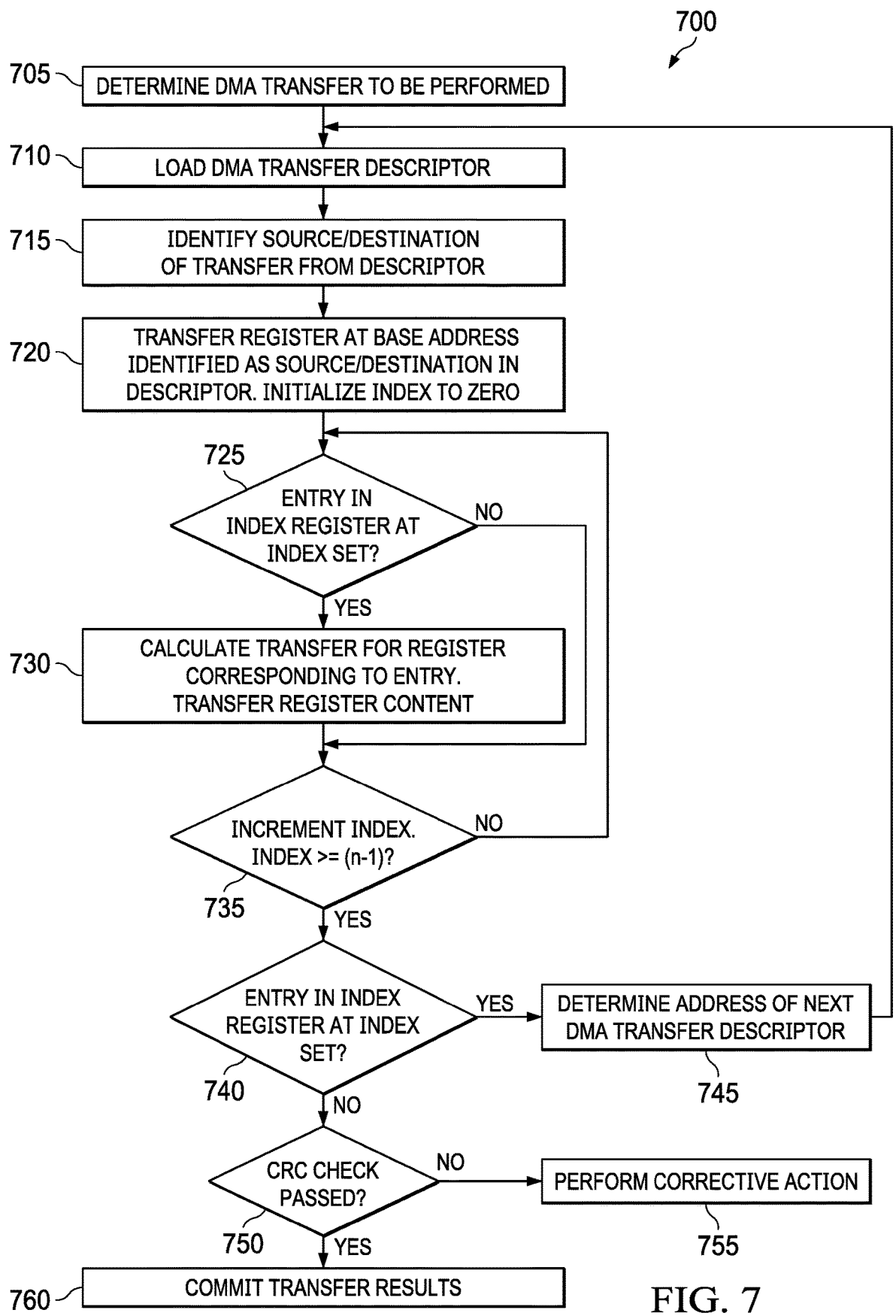
FIG. 7 is an illustration of a method for DMA transfers, according to embodiments of the present disclosure.

FIG. 7 is an illustration of a method 700 for DMA transfers, according to embodiments of the present disclosure. Method 700 may be implemented by any suitable portion of system 100 as illustrated in FIGS. 1-5, such as by DMA controller 102. Method 700 may be performed with more or fewer steps than those shown in FIG. 7. Moreover, the steps of method 700 may be repeated, omitted, performed in parallel, performed recursively, or performed in a different order than shown in FIG. 7. Method 700 may repeat as necessary. Method 700 may begin at any step, such as at step 705.

At step 705, it may be determined that a DMA transfer is to be performed. The DMA transfer may be identified by a first DMA transfer descriptor. The DMA transfer may be initiated and an address of the DMA transfer descriptor for the DMA transfer may be determined.

At step 710, the DMA transfer descriptor may be loaded. The DMA transfer descriptor may be loaded from system memory.

At step 715, a source or destination address may be identified from the loaded DMA transfer descriptor.

At step 720, selective DMA transfer of registers within a contiguous block of n registers may begin. The register at a base address corresponding to the source or destination address from step 715 may be transferred. An index may be set to zero.

At step 725, it may be determined whether an entry in an index register from the DMA transfer descriptor at the index is set, indicating that the register corresponding to the entry is to be transferred, or clear, indicating that the entry is not to be transferred. If the entry is set, method 700 may proceed to step 730. Otherwise, method 700 may proceed to step 735.

At step 730, a transfer for a register within the contiguous block of n registers, but after the register at a base address corresponding to the source or destination address from step 715, identified by the index for the index register in step 725, may be calculated. The address of the register to be transferred may be given by ([SADDR or DADDR, as applicable]+w [word size]*(1+index)). Content may be transferred according to the calculations. After the transfer of content is performed, method 700 may proceed to step 735.

At step 735, index may be incremented, and it may be determined whether index is greater than or equal to (n−1), wherein n is the size of the contiguous block to be evaluated for transfers with the DMA transfer descriptor. If the index is greater than or equal to (n−1), method 700 may proceed to step 740. Otherwise, method 700 may repeat at step 725 to further evaluate contents of the index register.

At step 740, it may be determined whether the last element of the index array is set. If so, additional content is to be transferred, as identified by other DMA transfer descriptors, and method 700 may proceed to step 745. Otherwise, method 700 may proceed to step 750.

At step 745, an address of the next DMA transfer descriptor for the given DMA transfer may be determined from the present DMA transfer descriptor. Method 700 may repeat at 710 to load and utilize the next DMA transfer descriptor.

At step 750, any suitable operation or check of the data may be performed. For example, a CRC check may be performed, wherein content to be transferred is evaluated against a known CRC value. If the CRC check passes, method 700 may proceed to step 760. Otherwise, method 700 may proceed to step 755.

At step 755, any suitable corrective action may be taken based upon the failure of the check of step 750.

At step 760, transfer results may be committed.

Although particular embodiments have been described within this disclosure, one of skill in the art will recognize that certain additions, changes, and variations may be made without departing from the spirit and teachings of the present disclosure.

What is claimed is:

1. A direct memory access (DMA) controller, including circuitry configured to:
   load a first DMA transfer descriptor, the first DMA transfer descriptor configured to define which memory elements within a first contiguous block of n memory elements are to be included in a given DMA transfer;
   based on the first DMA transfer descriptor, determine whether each memory element within the first contiguous block of n memory elements is to be included in the given DMA transfer, including a determination that a plurality of non-contiguous sub-blocks of memory elements within the first contiguous block of n memory elements are to be transferred; and
   based on the determination of whether each memory element within the first contiguous block of n memory elements is to be included in the given DMA transfer, perform the DMA transfer of memory elements determined to be included within the given DMA transfer.

2. The DMA controller of claim 1, wherein the circuitry is further configured to:
   determine that additional memory elements are to be included in the given DMA transfer;
   load a second DMA transfer descriptor, the second DMA transfer descriptor configured to define which memory elements within a second contiguous block of n memory elements are to be included in a given DMA transfer;
   based on the second DMA transfer descriptor, determine whether each memory element within the second contiguous block of n memory elements is to be included in the given DMA transfer, including a determination that a plurality of non-contiguous sub-blocks of memory elements within the second contiguous block of n memory elements are to be transferred; and
   based on the determination of whether each memory element within the second contiguous block of n memory elements is to be included in the given DMA transfer, perform the DMA transfer of memory elements determined to be included within the given DMA transfer.

3. The DMA controller of claim 2, wherein the circuitry is further configured to determine that additional memory elements are to be included in the given DMA transfer from information included in the first DMA transfer descriptor.

4. The DMA controller of claim 2, wherein the circuitry is further configured to determine an address of the second DMA transfer descriptor from information included in the first DMA transfer descriptor.

5. The DMA controller of claim 2, wherein the first and second contiguous blocks of n memory elements to be included in the given DMA transfer are within a same peripheral.

6. The DMA controller of claim 2, wherein the first and second contiguous blocks of n memory elements to be included in the given DMA transfer are within a different peripheral.

7. The DMA controller of claim 2, wherein the first DMA transfer descriptor is configured to define all of the plurality of non-contiguous sub-blocks within the first contiguous block of n memory elements are to be transferred.

8. The DMA controller of claim 1, wherein the first DMA transfer descriptor is further configured to define the plurality of non-contiguous sub-blocks of memory elements within the first contiguous block of n memory elements.

9. The DMA controller of claim 8, wherein the first DMA transfer descriptor is further configured to define a first memory element within the first contiguous block of n memory elements to be included in the given DMA transfer by a base address of the first contiguous block of n memory elements.

10. The DMA controller of claim 8, wherein the first DMA transfer descriptor is further configured to define one or more second memory elements within the first contiguous block of n memory elements to be included in the given DMA transfer by a plurality of indicators.

11. The DMA controller of claim 10, wherein the plurality of indicators includes a series of bits, each bit configured to indicate whether an associated memory element is to be included in the given DMA transfer.

12. The DMA controller of claim 11, wherein the series of bits includes n bits.

13. The DMA controller of claim 12, wherein one of the n bits is configured to indicate that additional memory elements are to be included in the given DMA transfer.

14. The DMA controller of claim 1, wherein the first contiguous block of n memory elements to be included in the given DMA transfer is within a register bank and the first contiguous block of n memory elements to be included in the given DMA transfer has a different base address than the register bank.

15. A method for direct memory access (DMA) control, including:
    loading a first DMA transfer descriptor, the first DMA transfer descriptor defining which memory elements within a first contiguous block of n memory elements are to be included in a given DMA transfer;
    based on the first DMA transfer descriptor, determining whether each memory element within the first contiguous block of n memory elements is to be included in the given DMA transfer, including a determination that a plurality of non-contiguous sub-blocks of memory elements within the first contiguous block of n memory elements are to be transferred; and
    based on the determination of whether each memory element within the first contiguous block of n memory elements is to be included in the given DMA transfer, performing the DMA transfer of memory elements determined to be included within the given DMA transfer.

16. The method of claim 15, further comprising:
    determining that additional memory elements are to be included in the given DMA transfer;
    loading a second DMA transfer descriptor, the second DMA transfer descriptor configured to define which memory elements within a second contiguous block of n memory elements are to be included in a given DMA transfer;
    based on the second DMA transfer descriptor, determining whether each memory element within the second contiguous block of n memory elements is to be included in the given DMA transfer, including a determination that a plurality of non-contiguous sub-blocks of memory elements within the second contiguous block of n memory elements are to be transferred; and
    based on the determination of whether each memory element within the second contiguous block of n memory elements is to be included in the given DMA transfer, performing the DMA transfer of memory elements determined to be included within the given DMA transfer.

17. The method of claim 16, further comprising determining that additional memory elements are to be included in the given DMA transfer from information included in the first DMA transfer descriptor.

18. The method of claim 16, further comprising determining an address of the second DMA transfer descriptor from information included in the first DMA transfer descriptor.

19. The method of claim 16, further comprising, defining, in the first DMA transfer descriptor, all of the plurality of non-contiguous sub-blocks within the first contiguous block of n memory elements are to be transferred.

20. The method of claim 15, further comprising, wherein the first DMA transfer descriptor is further configured to define the plurality of non-contiguous sub-blocks of memory elements within the first contiguous block of n memory elements.

* * * * *